J. G. JOHNSON.
Time Signal.
No. 108,792.
4 Sheets—Sheet 1.
Patented Nov. 1, 1870.
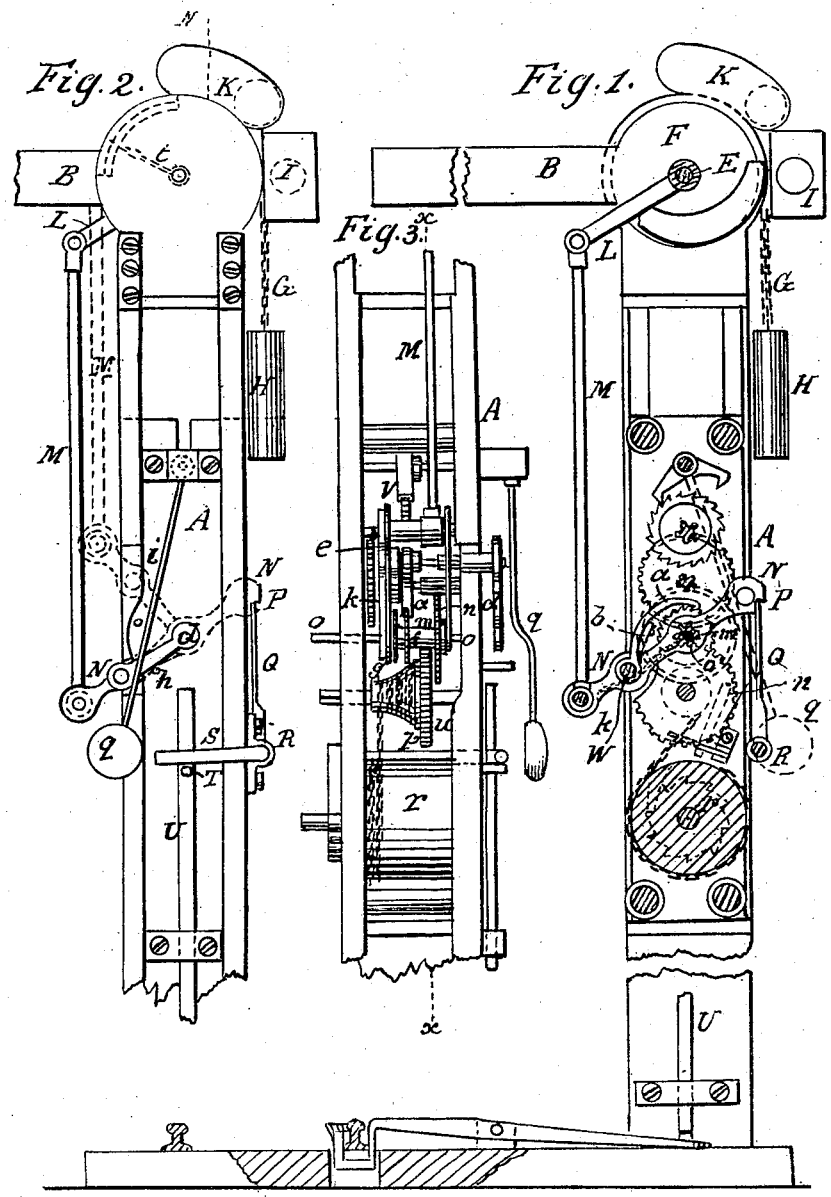

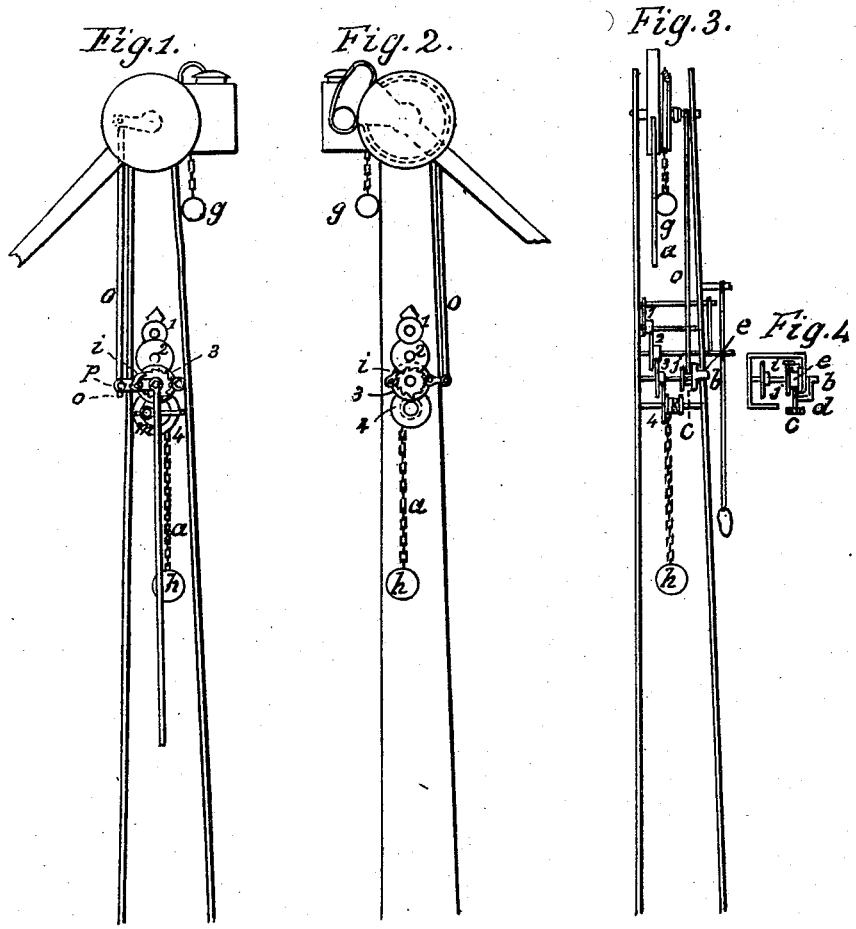

J. G. JOHNSON.
Time Signal.
No. 108,792.
4 Sheets—Sheet 3.
Patented Nov. 1, 1870.
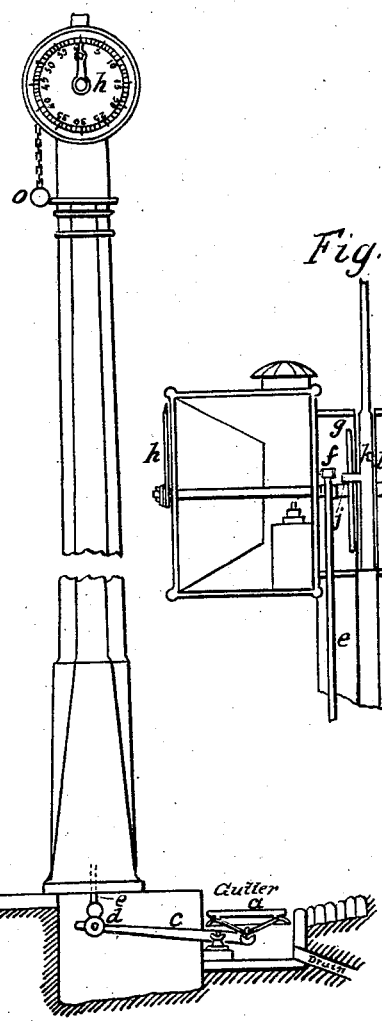

J. G. JOHNSON.
Time Signal.
4 Sheets—Sheet 4.
No. 108,792.
Patented Nov. 1, 1870.
Fig. 1.
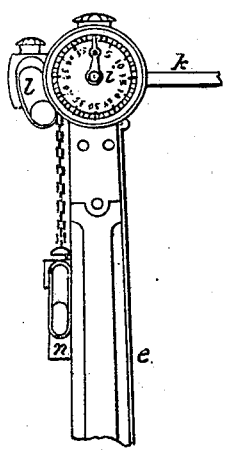
Fig. 3.
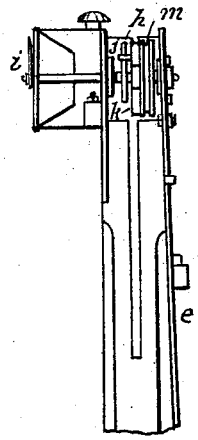
Fig. 2.
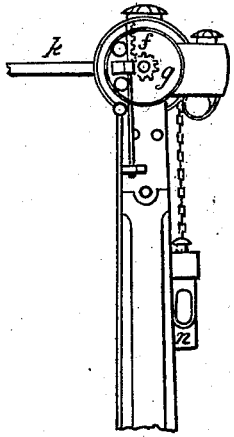
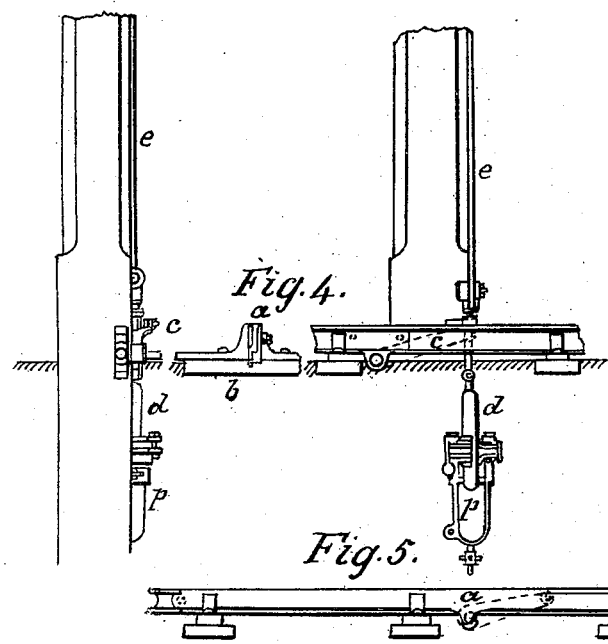
Fig. 4.
Fig. 5.
Witnesses:
John Becker
D. S. Mabee
Inventor:
John Garner Johnson
Per
Attorneys.

UNITED STATES PATENT OFFICE.

JOHN GARNER JOHNSON, OF COOMBE FIELDS, ENGLAND.

IMPROVEMENT IN TIME SIGNALING APPARATUS FOR RAILROADS.

Specification forming part of Letters Patent No. 108,792, dated November 1, 1870.

*To all whom it may concern:*

Be it known that I, JOHN GARNER JOHNSON, of Coombe Fields, in the county of Warwick, England, have invented new and useful Improvements in Self-Acting Signaling Apparatus; and I do hereby declare that the following is a full, clear, and exact description thereof, which will enable others skilled in the art to make and use the same, reference being had to the accompanying drawings, forming part of this specification.

This invention relates to improvements in signaling apparatus for railways, tramways, &c.; and it consists in an improved self-acting apparatus wherein the signal is thrown up to indicate the passing of a train by a weight let fall by the action of the wheels of the train on a lever and tripping-catch when passing the signal, and the said signal is reset by a clock mechanism with a balance-wheel or pendulum, so as to indicate the length of time in which the signal-arm or pointer moves or falls from one position to another. The clockwork mechanism may be fixed upon a supporting frame or column, in any convenient position, in a suitable case, which may be affixed outside the frame or column or be placed inside.

Figure 1 is a sectional elevation of the improved signaling apparatus, also a section through the track. Fig. 2 is a side elevation of the upper part of the same. Fig. 3 is a partial elevation of the same, taken in a plane at right angles to the planes of Figs. 1 and 2; and Fig. 4 is a detail of a part of the operating mechanism.

A represents the post for supporting the signal-arm B and its operating mechanism. This post is placed at a convenient distance from the rails C, over which the trains to be signaled pass, and at the point along the track where it is required to signal them.

D is a tripping-lever, so arranged at one end that the wheels of the passing train will throw the other end, extending to the post, where it is connected to a tripping device, up to let the weight which throws up the signal-arm free. This arm is pivoted in the top of the post A at E, and the axle on which it is pivoted is provided with a drum, F, on which a chain, G, suspending a weight, is wound, and arranged so that when the drum is not restrained it will raise the arm from the horizontal to a vertical position. The drum-restraining devices are such as to hold the arm in the horizontal position until the train comes and raises the trip-lever and lets the weight free. This raises the arm and signals the approaching train.

I is the case for the lamp to be used in the night, when the arm cannot be seen, and K is the colored glass for covering the light when the arm is thrown up.

The apparatus for resetting and holding the arm B in the horizontal position is as follows: The drum F is connected by an arm, I, and rod M to an arm, N, pivoted on a journal, O, mounted in the post a suitable distance below the top. This arm extends through the long and wide slot in the post prepared for the reception of the clock mechanism, and has at the other side a notch at P, under which the holding and tripping catch Q falls, when the arm B is turned down to hold it there. This catch is connected to the rock-shaft R, having a weighted arm, S, extending along the side of the post, to be acted upon by the pin T in the vertical rod U, extending down to the trip-lever D, to be raised by it to throw the catch out of the notch of the arm N and let the weight fall and raise the arm B when the cars raise the said lever D.

The weighted arm S throws the catch Q back after the pin T goes back. The said arm N is connected with another similar arm, V, also journaled on the axis O by rods W X, constituting a frame for the support of the said rods. The rod W carries the ratchet-pawls $a$ $b$, an arm $d$, and a friction-disk, $e$. The pawl $a$ is free to vibrate on the said rod W, and engages the ratchet-wheel $f$ on the axle O, so as to draw toward the rod W, or be drawn from it by the said wheel. The pawl $b$ engages the teeth of the ratchet-wheel $g$ on the same axle O, so as to push in the opposite direction, or be pushed toward it. The arm $d$ strikes against a pin, $h$, in the side of the post when the arm N goes down, and is arrested thereby, and raises the pawl $b$ out of contact with the wheel $g$; and when the arm N goes up it is arrested by the pin $i$, and thereby causes the pawl $b$ to fall into the notches of the said wheel $g$. The rod W, pawl $b$, and arm $d$ are held in either position to which they are thus adjusted by the spring K bearing against the disk $e$.

The axle O, which supports the arms N N and the ratchet-wheels *f g*, is also an intermediate axle of a train of clock-gearing, (clearly shown in the drawings,) to the large gear *n* of the fusee *p* of which it is connected by the pinion *m*. This train is worked by a pendulum, *q*, and a spring-drum, *v*, in the usual way. The axle O and its ratchets turn to the left, or toward the pawls *a b*.

It will be seen that when the catch Q has been tripped by the passing train and the arm B thrown up by the weight the pawl *a* will be advanced on its wheel about a quarter of a revolution, where it will take a new hold, and the pawl *b* will be forced down into engagement with the teeth of the wheel *g* by the arm *d* and pin *i*. This wheel, being turned by the clock-work in the direction to restore the arm B to the horizontal position, immediately acts on the arm N, rod M, and arm L, through the medium of the pawl *b*, to effect the resetting; and the holding-pawl *a* and wheel *g* prevent the arm B from falling after passing from the vertical line. When the arm N has been curved around far enough to allow the catch Q to fall into the notch P and hold the arm B in the horizontal position again, the arm *d*, striking the pin *h*, disengages the pawl *b* from the wheel *g* and leaves the clock mechanism free to continue its movement for resetting again when once the train has passed and the arm B has been thrown up.

The axle O, by which the arm is reset, is the same or may have the same speed as the one which turns minute-hand of the clock has, and it or the axle of the arm B may have a pointer, *t*, to work over a dial placed on the post, to show the progress of the resetting of the arm.

The axis of the arm B may be made to coincide with the axle O, and the arm N may take the place of the arm L, dispensing with the intermediate rod, M.

I will now proceed to describe a modified arrangement of clock mechanism operating the signal-arm. Figs. 1, 2, and 3 on Sheet 2 are elevations, showing how the same can be accomplished, and Fig. 4 a plan showing the connections and arrangements of the whole. The wheels, with the pinions employed, are numbered 1, 2, 3, and 4, and need no description, as they are the same as used in ordinary clock-work, also the pendulum drum and weight. The signal-rod in this arrangement is in two pieces, being connected by two levers, with catches that act upon two ratchet-wheels placed on each side of the one to which the upper portion of the signal-rod is fixed. Fig. 4 shows the whole arrangement. Upon the rod D being raised, as shown in the drawings on Sheet 1, it lifts the lever *b* and catch *c*, which moves on a stud, *d*, fixed into the lever *e*, out of the ratchet-wheel *f*, when the whole is liberated and drawn up to the required position by the smaller weight *g*. The catch *c* then falls again into the ratchet-wheel *f*, and is pulled back again by the weight *h* acting on the wheels, and the wheels acting through the catch *c* to the ratchet-wheel *f*, and the same is repeated whenever the lower rod is raised, it being disconnected with the lever *b*, and only raises it when contact is made by pressure upon the rod *a*. The catch *i*, fixed upon the end of the lever, slips upon the ratchet-wheel *j* when the signal and rod goes up, and prevents it descending again only at the rate the ratchet-wheel *f* and *j* move. The lower rod, *a*, has a stud, *k*, fixed in the upper portion, which raises the lever fixed to the post by the pin *m*, as well as the lever *b*. When lifted, it throws the catch *n* out of the one at the end of the signal-rod *o*, which prevents the signal and rod going up until released by the wheel's action upon the rod *a*. There is also another catch at the lower end of *c*, which comes in contact with a fixed plate, *p*, upon the post, which throws *c* out of the ratchet-wheel *f* when the signal-arm is down and the clock still goes on. By the clock's motion signals at any fixed interval of time might be indicated by causing the lever *b* to be lifted by the teeth of a ratchet-wheel fixed upon one of the spindles or shafts.

Fig. 1, Sheet 3, represents a front elevation of another modification of my improved signal apparatus; Fig. 2, a side view of the same; and Fig. 3, the apparatus, showing how the same is worked, which is marked with the same letters as are upon the other drawings just referred to, but arranged so as to be made available for almost any kind of traffic, omnibuses in particular.

Upon Figs. 1 and 2 is a flat plate fixed in the gutter in the side of the street, which transmits, by the pressure of the wheels passing over it, motion through the angular levers, upon the same principle as a weighing-machine motion, to a second lever, *c*, to which the weight *d* and the signal-rod *e* are fixed. Upon this rod being raised it moves by its action a second lever, *f*, Fig. 3, to which is attached (or a rack and pinion may be used) the plate *g* and the hand or index-pointer *h*, all of which are fixed upon the shaft or arbor *i* and move together. The arm *k* and the pulley *l*, being separately connected, are acted upon by the smaller weight *o*, Fig. 1, being loose upon the shaft, as in the previous drawings. Upon the rim of the pulley *l* a chain is fixed, to which the weight *o*, Fig. 1, is suspended. Upon the outer edge of the plate *g* a stud, *j*, projects, which, on coming in contact with the other projecting stud from the arm, carries it with it, causing the pulley *l* to revolve slowly and lift the smaller weight *o*. Upon the side of this pulley a catch, *m*, is fixed, which slips over the teeth of the ratchet-wheel *n* by the action of the smaller weight, when the signal-rod is raised, which also raises the arm to the required position. When up, the catch enters the teeth of the ratchet-wheel *n*, which is connected by a collar to the minute-wheel *p* of the clock-work, both of which are loose upon the shaft. The power of the weight *d* and signal-rod is then transmitted through the whole, by means of the stud and ratchet-wheel, to the clock-work, which is set in motion. It, being of the same description as that in ordinary use, for the measurement of time, requires no explanation.

I propose also to employ a modification of the foregoing arrangements by attaching to a convenient frame or support fixed by the side of the railway or tramway a signal-arm, and also an index-pointer and dial, in such a manner that the tires of the wheel of the passing engine or carriage, or some part of the engine or carriage, may act upon a bar, which acts upon a cam, so as to give motion, through a connecting rod and lever, to a rod attached to the frame or support. To one end of the rod is attached a rack, and at the other end is a piston working in a suitable cylinder, like that of a force-pump. The rod, on being raised or lowered, acts upon and turns a pinion, which carries with it the signal-arm and also the index-pointer which move on the face of the dial. The passing engine or carriage acts, by means of the levers and rod above mentioned, upon the pinion-wheel, and so upon the signal-arm and index-pointer, which are thereby set at a given position—for example, so that the index-pointer points to zero on the dial-plate. The rod, and with it the piston, being raised, produces a vacuum in the cylinder, which is connected with a suitable small reservoir or vessel containing water or other fluid. The fluid rushes in through the suction-pipe and fills the cylinder. The piston and signal-rod and any necessary weight that may be attached to them begin then to press upon the water or other fluid contained in the cylinder with a constant and uniform pressure. The water or other fluid is then allowed to flow out of the cylinder through a small aperture at a given speed, which may be regulated by any suitable valve. As the fluid issues the piston descends and moves the signal-arm and the index-pointer on the block-dial at any given rate. I prefer that the rate be that of the minute-hand of a clock moving through spaces representing sixty minutes to the hour. Any observer, looking at the signal-arm and index-pointer after an engine or carriage train had passed the signal-station, would be able to know how long a time had elapsed since the passage, and to calculate, if the speed of traveling were known, how far the engine, carriage, or train might be expected to be ahead.

Instead of using a metallic cylinder like that of a force-pump, other vessels made of other materials—such as leather or gutta-percha—might be used.

It will be obvious that my system of signaling apparatus may be applied to other purposes besides being used for railways, and may be used in all cases where it is required that the position of a signal-arm or index-pointer at any given time shall indicate how long a time has elapsed since the arm or pointer was started from zero.

By fixing a pencil or pointed instrument upon the signal-rod and causing a coil of paper to revolve against it by means of the clock-work, the number of trains, the time between each, and the space passed over in a given time would be indicated upon the diagram, which would show, if transmitted to the manager, how the train had been worked throughout the line on the previous day. To this arrangement I make no claim as forming a part of my invention.

Sheet 1, Fig. 1, is a front elevation; Fig. 4, a portion of my improved signal apparatus, showing its connection with the outer rail; and Fig. 5, the lever or bar upon which the tire of the wheel acts, producing the necessary motion to the whole. Upon making it of sufficient length its action would be exactly the same as the eccentrics upon the force-pump of the locomotive.

$a$ represents the lever, which, on being slightly depressed by the tire of the wheel of the passing train, transmits the motion through the jaw to the cam $b$, thence by the connecting rod or bar to the lever $c$, which is connected by two side rods to the plunger $d$ and signal-rod $e$. Upon this rod being raised motion would be produced by the rack $f$, Fig. 2, to the pinion $g$, which is fixed upon the shaft or spindle, and carries with it the plate $h$, Fig. 3, and the hand or inner pointer, $i$.

From the plate $h$ a stud, $j$, projects, which comes in contact with another upon the signal-arm $k$, (when the signal is raised, and remains so during its depression,) carrying with it the signal-arm $k$ and colored glasses $l$, and also the pulley $m$, all of which are made to revolve loose upon the shaft or spindle. To this pulley a weight is suspended by a short chain made fast to it, which raises the arm slowly and independently of engine-wheels. Action upon the lever or bar $a$ at the same time keeps the two studs in close contact, in the same way as the driver acts upon a carrier in a lathe when turning a bar of iron. The plunger $d$ represents the power the studs transmit it, and the weight $n$ acts as the resisting force, which may be a flat plate with colored glasses placed before a second lamp fixed upon the side of the post, or one made hollow, so that by the insertion of a few shots or like substances, to increase or diminish its weight, it should so alter the power of the plunger's action upon the water in the cylinder, as they act in opposition to each other, in the same way as two unequal weights would do if suspended by a cord over a loose pulley. The difference can be made equal to anything I please; but as only a slight power is required to press upon the water in the pump, in addition to the friction of the parts, a few pounds will suffice upon the plunger $d$ being raised.

The water from the reservoir $o$ (which can be placed in any convenient position) rushes into the cylinder $p$ through the pipe $q$ and fills it; and as there are no other means for its escape, only at a regulated speed through the outlet-pipe $r$, a slow but regular motion is produced, which is transmitted, as the plunger sinks, through the rod *e* to the signal-arm, index-pointer, lights, and so forth, thereby indicating all the signals in use and time between trains.

In order to reduce the friction by the packing of the pump to a minimum and make it a constant quantity, two washers, *s s*, are placed round the plunger, with a metal one, *t*, between them, into the grooves. In the former an india-rubber ring is placed, the tension of which not only keeps them perfectly tight until they are worn out, but causes the friction to be always the same when once made fast by the glands. Points may also be opened or kept closed for any fixed interval of time, upon similar principles, by the action of the plunger of a force-pump upon a cam or lever with a slot in the end, for when once full it cannot possibly move until the water is allowed to escape.

Having thus described my invention, I claim as new and desire to secure by Letters Patent—

1. The combination, with lever D, rod U T, and weighted lever S Q, of notched arm N, rod M, arm L, shaft E, drum F, weighted arm B H, case I, and cover K, all constructed and relatively arranged to form an improved signaling apparatus.

2. The improved signaling apparatus above described, in combination with arm V *d*, pawls *a b*, friction-disk *e*, ratchets *f g*, pins *h i*, spring *k*, and a clock mechanism, all relatively arranged as and for the purpose described.

The above specification of my invention signed by me this 5th day of July, 1869.

JOHN G. JOHNSON. [L. S.]

Witnesses:
ALEX. P. WRIGHT,
*Secretary to the Inventors Patent Right Association, (Limited,) 21 Cockspur Street, Charing Cross.*

THOMAS MORGAN,
21 *Cockspur Street, Charing Cross.*